(12) United States Patent
Uekawa

(10) Patent No.: US 6,870,990 B2
(45) Date of Patent: Mar. 22, 2005

(54) OPTICAL DEVICE, OPTICAL DEVICE MOUNTING METHOD, AND OPTICAL MODULE

(75) Inventor: Masahiro Uekawa, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/458,584

(22) Filed: Jun. 11, 2003

(65) Prior Publication Data
US 2003/0228109 A1 Dec. 11, 2003

(30) Foreign Application Priority Data
Jun. 11, 2002 (JP) ........................................ 2002-170296

(51) Int. Cl.[7] .............................. G02B 6/30; G02B 6/26
(52) U.S. Cl. .............................. 385/49; 385/31; 385/52; 385/88; 385/90
(58) Field of Search .............................. 385/14, 31, 49, 385/52, 88, 90, 50, 51

(56) References Cited

U.S. PATENT DOCUMENTS 6,236,788 B1 * 5/2001 Moisel ........................ 385/52
6,263,137 B1 * 7/2001 Yoneyama et al. ........... 385/49

FOREIGN PATENT DOCUMENTS

| JP | 07199006 | 8/1995 |
| JP | 11295561 | 10/1999 |

* cited by examiner

Primary Examiner—John R. Lee
Assistant Examiner—Paul M. Gurzo
(74) Attorney, Agent, or Firm—Rabin & Berdo, P.C.

(57) ABSTRACT

An optical element 1 comprises an optical substrate having a lens 2, projections 4a and 4b, and a handle 6. The lens 2 is provided to the roughly rectangular handle 6 at a predetermined position thereon, while the projections 4a and 4b are provided to the handle 6 at the respective positions separate from the lens 2 by a predetermined distance and each have a semi-cylindrical shape that extends from a bottom of the handle 6. An overall size of an arc shape of each of the projections 4a and 4b is equal to an overall size of an optical fiber with which the optical element 1 is to be coupled optically. When mounting the optical element 1 on a support substrate having a mounting groove therein, the projections 4a and 4b butt against the mounting groove, thereby positioning the optical element 1 in a direction perpendicular to an optical axis.

12 Claims, 3 Drawing Sheets

OPTICAL DEVICE, OPTICAL DEVICE MOUNTING METHOD, AND OPTICAL MODULE

BACKGROUND OF THE INVENTION

1. Field of the Invention

The present invention relates to an optical device well suited for application to optical communication equipment, an optical module including an optical device, and a method for mounting the optical device into the optical module.

2. Description of the Related Art

An optical device such as a micro-lens coupled with a laser diode or an optical fiber in a field of optical communication is disclosed in, for example, Jpn. Pat. Appln. KOKAI Publication No. Hei 07-199006 and Jpn. Pat. Appln. KOKAI Publication No. Hei 11-295561.

The former publication proposes a technology for optically coupling a laser diode and an optical fiber by using a ball lens. The latter proposes a technology for optically coupling a laser diode and an optical fiber by using an aspherical lens having a cylindrical outer periphery.

A further conventional technology is proposed for manufacturing an optical device such as a lens in the optical communication field by using photolithographic and etching processes. By this technology, for example, a desired shape such as that of a lens is formed on a silicon substrate in a photolithographic process and then unnecessary portions of the silicon are removed by etching, to form a desired optical device.

A lens proposed in the conventional technologies is arranged in a groove formed at a predetermined position in a semiconductor support substrate on which a laser diode, an optical fiber, etc. are to be installed, in such a manner that optical axes of the laser diode, the optical fiber, etc. may coincide with each other to optically couple them properly.

To couple a laser diode, an optical fiber, etc. at a high efficiency, it is necessary for a lens upon which a diffusion light emitted from the laser diode is made incident to have a lens diameter sufficiently larger than a diameter of the diffusion light. In some cases, the lens needs to have a diameter larger than that of an optical fiber to be coupled therewith.

Conventionally, however, as described in Jpn. Pat. Appln. KOKAI Publication No. Hei 11-295561, when mounting a lens, the lens is placed in a groove formed in a substrate, in such a manner that its cylindrical outer periphery may come in contact with the groove. Such a lens having a larger diameter than an optical fiber is also mounted similarly by forming such a groove that its size may be larger than an outer diameter of the optical fiber.

However, such a configuration has a drawback in improvement of mounting precision from a viewpoint of outline precision of a lens. That is, since the diameter of the optical fiber and that of the lens are different from each other, it is necessary for a groove in which the optical fiber is placed and a groove in which the lens is placed to be different from each other in cross-section or size, thereby giving a restriction that the two grooves must be formed in separate manufacturing steps. As a result, a problem occurs that a difference in the separate manufacturing steps may deteriorate the mounting precision.

To avoid this problem and improve the mounting precision, preferably a lens having the same outer diameter as that of an optical fiber to be optically coupled therewith is placed at a groove in which the optical fiber is to be mounted.

In this case, however, a maximum tolerable value of the lens outer diameter is 125 $\mu$m in the case of, for example, a typical single-mode optical fiber, so that the lens diameter is limited to this outer diameter. It has thus been difficult for the conventional technologies to improve the mounting precision without a limit in size of the lens.

SUMMARY OF THE INVENTION

To solve these problems, the present invention has been developed, and it is an object of the present invention to provide an optical device that can be mounted precisely independently of a size of its effective diameter, a method for mounting the optical device, and an optical module in which the optical device is mounted precisely.

An optical element of the present invention comprises an optical substrate having a lens, a projection, and a handle. The lens is provided to the roughly rectangular handle at a predetermined position thereon, and a projection is provided to the handle at a position thereon separate from the lens by a predetermined distance and has a semi-cylindrical shape extending from a bottom face of the handle. An outer size of an arc-like shape of the projection is equal to that of an optical fiber with which an optical element 1 is coupled optically. When mounting the optical element 1 on a support substrate having a mounting groove therein, projections 4a and 4b butt against the mounting groove, thereby determining a position in a direction perpendicular to an optical axis.

DETAILED DESCRIPTION OF THE PREFERRED EMBODIMENTS

The following will describe embodiments of the present invention with reference to the drawings. In the following description and the accompanying drawings, the same components having roughly the same functions and configurations are indicated by the same reference symbols to thereby avoid duplications.

Figure 1:
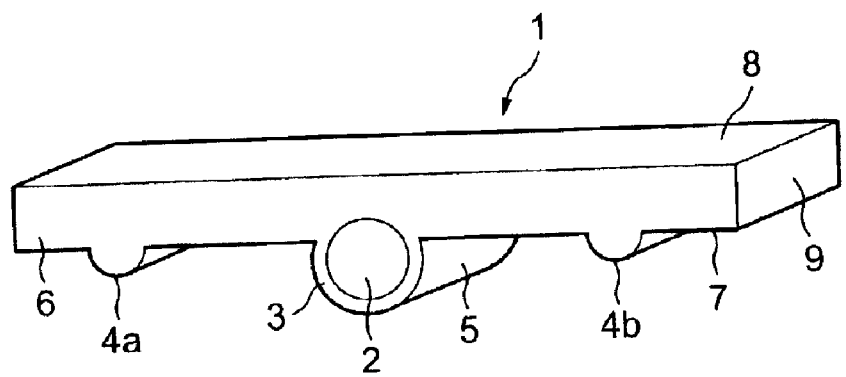
FIG. 1 is a perspective view for showing a configuration of an optical element according to a first embodiment of the present invention.

FIG. 1 is a perspective view showing a configuration of an optical element 1 according to a first embodiment of the present invention. The optical element 1 comprises an optical substrate and is mounted on a support substrate having a mounting groove therein for containing an optical device, and is integrated in an optical module.

The optical element 1 mainly comprises a lens 2, a projection 4a, a projection 4b, and a handle 6.

As shown in FIG. 1, the lens 2 is positioned nearly at a center of the roughly rectangular handle 6 extending to right and left. The handle 6 is provided with the projections 4a and 4b at the respective predetermined positions distant from the lens 2 by a predetermined spacing.

The lens 2 is circular in shape in the present embodiment and constituted of a Computer Generated Hologram (CGH) element, which is a diffractive optical device. The CGH element refers to a diffractive optical device having desired optical characteristics and is formed by obtaining a photo-mask pattern necessary to obtain the desired optical characteristics, based on an optical path difference function of an optical device exhibiting the desired optical characteristics, and then performing etching processing on a surface of an optical substrate at a desired position using the mask pattern. Hereinafter, a face of a side of the optical element 1 on which the lens 2 is formed is referred to as lens formation face.

There is, on a lower side of the lens 2, provided an arch-shaped rim 3 along a lower profile of the lens 2. An arc-shaped outline of the rim 3 extends from the lens formation face side of the optical element 1 to its opposite face side, thereby forming a semi-cylindrical shape having an optical axis of the lens 2 as a central axis.

This semi-cylindrical portion extending downward from the center of the handle 6 is referred to as an extension 5. Two end faces of the extension 5 are so formed as to be flush with the respective corresponding predetermined faces of the handle 6. Further, the lens 2 is formed in a plane defined by one of the end faces of the extension 5 and the corresponding predetermined face of the handle 6. The lens 2 is specifically formed so that its optical axis may be perpendicular to a surface thereof. The lens 2 may have a diameter of, for example, 50–1000 μm.

The two projections 4a and 4b are both separated from the lens 2 by the predetermined distance and formed in such a manner as to extend downward from the handle 6. These two projections 4a and 4b have a shape of a semi-cylinder similar to that of the extension 5 and constitute part of a column having a long axis parallel to the optical axis of the lens 2. It is to be noted that a size of an outer diameter of the semi-cylindrical shape of each of the projections 4a and 4b need not be the same as that of an outer diameter of the semi-cylindrical shape of the extension 5, but are designed to be equal to a size of an outer diameter of an optical fiber to be optically coupled with the optical element 1. Further, the outer diameters of the projections 4a and 4b in the present embodiment are 125 μm to match an outer diameter of a single-mode optical fiber. The projections 4a and 4b come in contact with the mounting groove to thus provide a reference for alignment when the optical element 1 is mounted on the support substrate having the mounting groove therein. It is to be noted that although the projections 4a and 4b are arranged roughly symmetrically with respect to the lens 2 as a center in this case, they need not always be done so.

As described above, the handle 6 is provided on an upper side of the lens 2 and has such a roughly rectangular shape as to extend right and left in parallel with the lens formation face and the opposite face in configuration. Further, the handle 6 is formed integrally with the lens 2, the rim 3, and the extensions 4a and 4b. A bottom face 7 of the handle 6, on which the extension 5 and the projections 4a and 4b project, faces the support substrate when the lens 1 is mounted on the support substrate. A top face 8 and side faces 9 of the handle 6 are formed flat. By thus forming the top face 8 and the side faces 9 flat, the optical element 1 can be held easily by holding means downward or sideward.

The holding means may be, for example, sandwiching means or a negative-pressure holding means such as a negative-pressure sucking disk for holding by sucking.

Although in the above description the rim 3 has been provided in such a manner as to surround the lens 2, it may be arranged in such a manner as to be defined by an outer periphery of the lens 2.

As an optical substrate which constitutes the optical element 1, a crystal substrate can be used. The optical substrate may be a silicon crystal substrate especially when a waveband of a light source of an optical system in which the optical element 1 is applied is 1.3 μm or 1.5 μm.

The optical element 1 can be produced by performing etching on a silicon substrate using photolithographic and etching technologies used in manufacturing of semiconductor devices. On the technologies, the silicon substrate is etched using a photo-mask pattern having a shape corresponding to the optical element 1.

Figure 2:
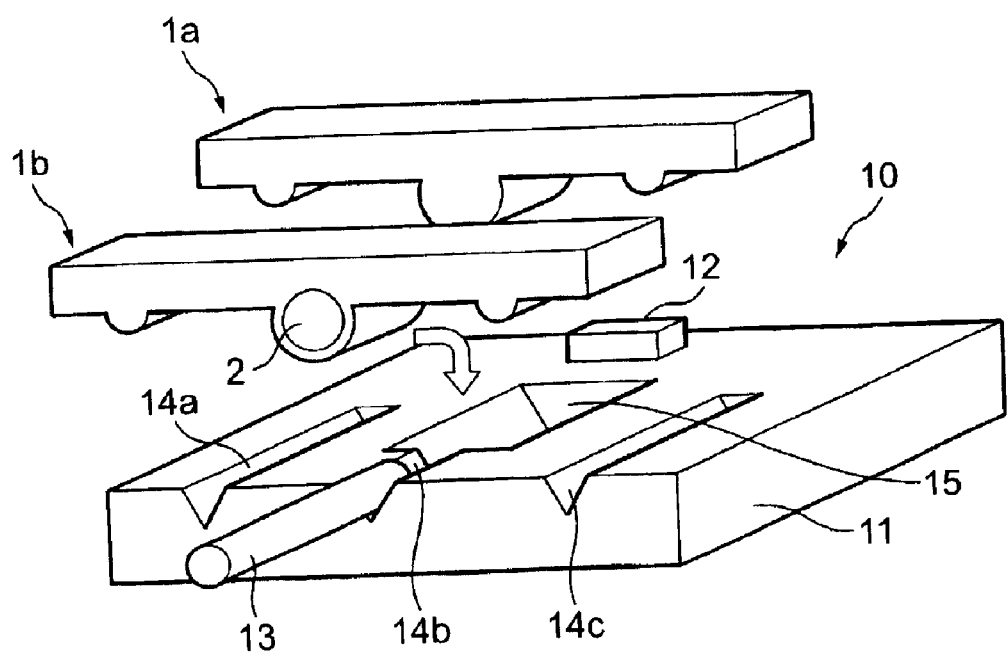
FIG. 2 is a perspective view for showing a configuration of an optical module using the optical element of FIG. 1.

FIG. 2 is a perspective view showing a configuration of an optical module using as many as two of the optical elements 1. An optical module 10 comprises a support substrate 11, a laser diode 12, a single-mode optical fiber 13 having a diameter of 125 μm, and two optical elements 1a and 1b.

The laser diode 12, the two optical elements 1a and 1b, and the optical fiber 13 are coupled optically, being arranged on the support substrate 11 in this order with predetermined spacings therebetween in such a manner as to share the same optical axis. The support substrate 11 has grooves therein for arranging members, which grooves are clearly shown in FIG. 2 in a condition where the optical elements 1a and 1b are yet to be mounted.

The support substrate 11 is constituted of a silicon crystal substrate. The support substrate 11 has, in its top face, three V-grooves 14a, 14b, and 14c which are formed in such a manner as to be mutually collimated and parallel, as well as a groove 15 which is formed in such a manner as to be continuous with the V-groove 14b.

The V-grooves 14a, 14b, and 14c are all V-shaped in cross section and have a size large enough to mount therein a single-mode optical fiber having a diameter of 125 μm. The V-grooves 14a and 14c are formed in the support substrate 11 from its one end through somewhere partway to the other end, into which the projections 4a and 4b of the optical element 1 are fitted respectively. The V-groove 14b is formed in the support substrate 11 from its one end to the groove 15, into which the optical fiber 13 is fixed. The groove 15 formed to be continuous with the V-groove 14b is roughly trapezoidal in cross section. The groove 15 is larger than the V-grooves 14a, 14b, and 14c and capable of containing the respective extensions 5 of the two optical elements 1a and 1b.

The V-grooves 14a, 14b, and 14c are formed simultaneously by performing anisotropic etching on the support substrate 11 in the same process. As a result, the V-grooves 14a, 14b, and 14c are formed precisely to have a previously set and predetermined physical relationship and the same cross-sectional shape.

The groove 15 is formed by forming the V-grooves 14a, 14b, and 14c and then, with parts thereof as protected, performing etching again using a mask having another appropriate pattern shape.

The following will describe how to mount the components described above on the support substrate 11. The laser diode 12 is precisely aligned downward with the support substrate 11 using a marker and soldered thereto using soldering bumps.

The projections 4a and 4b shown in FIG. 1 of each of the two optical elements 1a and 1b are formed symmetrically with respect to the lens 2 between right and left. Further, as indicated by an arrow in FIG. 2, the optical element 1a is arranged opposite to the optical element 1b, that is, in such a manner that its lens formation face may face in the depth direction of the figure. The extension 5 of each of the optical elements 1a and 1b is arranged in the groove 15 and the projections 4a and 4b of each thereof are arranged in the V-groove 14a and 14c respectively in such a manner as to be in contact with them.

As described above, it is possible to set precisely the physical relationship between the V-groove 14b and the other V-grooves 14a and 14b in which the single-mode optical fiber 13 is arranged and also between the lens 2 and the projections 4a and 4b of each of the optical elements 1a and 1b. By utilizing these relationships, it is possible to precisely determine a physical relationship perpendicular to the optical axis between the single-mode optical fiber 13 and the lens 2.

By setting positions of the V-grooves 14a and 14c and the projections 4a and 4b in such a manner that the physical relationship between the single-mode optical fiber 13 and the lens 2 may be appropriate, it is possible to position the single-mode optical fiber 13 and the lens 2 in a direction perpendicular to the optical axis.

They are positioned along the optical axis using a marker and arranged at appropriate locations as distinguishing between the optical elements 1a and 1b by utilizing image processing using, for example, a CCD camera.

The optical element 1a on the side of the laser diode 12 is arranged in such a manner that its lens formation face having the lens 2 thereon may face the laser diode 12. The optical element 1b on the side of the optical fiber 13 is arranged in such a manner that its lens formation face having the lens 2 thereon may face an end face of the optical fiber 13.

The optical elements 1a and 1b are specifically arranged at the appropriate positions on the support substrate 11 as holding the flat top face 8 or side face 9 by the suitable holding means. After it is confirmed that the optical elements 1a and 1b have been arranged at the appropriate positions, the optical elements 1a and 1b are fixed to the support substrate 11. The optical fiber 13 is fixed with a resin adhesive after its end is arranged in the V-groove 14b.

In the optical module 10 wherein the components have been arranged in such a manner, a divergent light emitted from the laser diode 12 enters the optical element 1a on the side of the laser diode 12, where it is collimated into a parallel light through the lens 2 of the optical element 1a.

Then, the parallel light enters the optical element 1b on the side of the optical fiber 13, where it is focused to a center of the end face of the optical fiber 13 through the lens 2 of the optical element 1b and enters the optical fiber 13.

The present inventor actually has experimentally produced an optical module having such configuration as described above and found that the optical element can be mounted readily and rapidly at high precision of ±1 µm. Further, the optical module has been able to have a coupling efficiency of 40%.

In the present embodiment, the projection is not directly provided on an outer periphery of the lens. Instead, the lens is provided to the handle at its predetermined position where it is arranged over the support substrate when it is mounted to the support substrate. Further, the projection provided at the positions separate from the lens of the handle by the predetermined distance is fitted and fixed into the grooves formed in the support substrate. Since an outline of the projection is made the same as that of the optical fiber, the groove in the support substrate for fixing the projection can be formed by the same step as that for the groove for fixing the optical fiber. As a result, the optical element can be mounted precisely.

Furthermore, in a configuration of the present embodiment, a size of an outer periphery of the lens has no influence on mounting precision, so that it is possible to design a size of the lens arbitrarily. This is effective especially when it is desired to mount a lens having a large effective diameter precisely. By using the optical element having the large effective lens diameter, it is possible to make a diffusion light emitted from the laser diode incident upon the lens effectively, to thus separate more the optical element and the laser diode from each other, thereby improving a degree of freedom in designing of a components layout.

Figure 3:
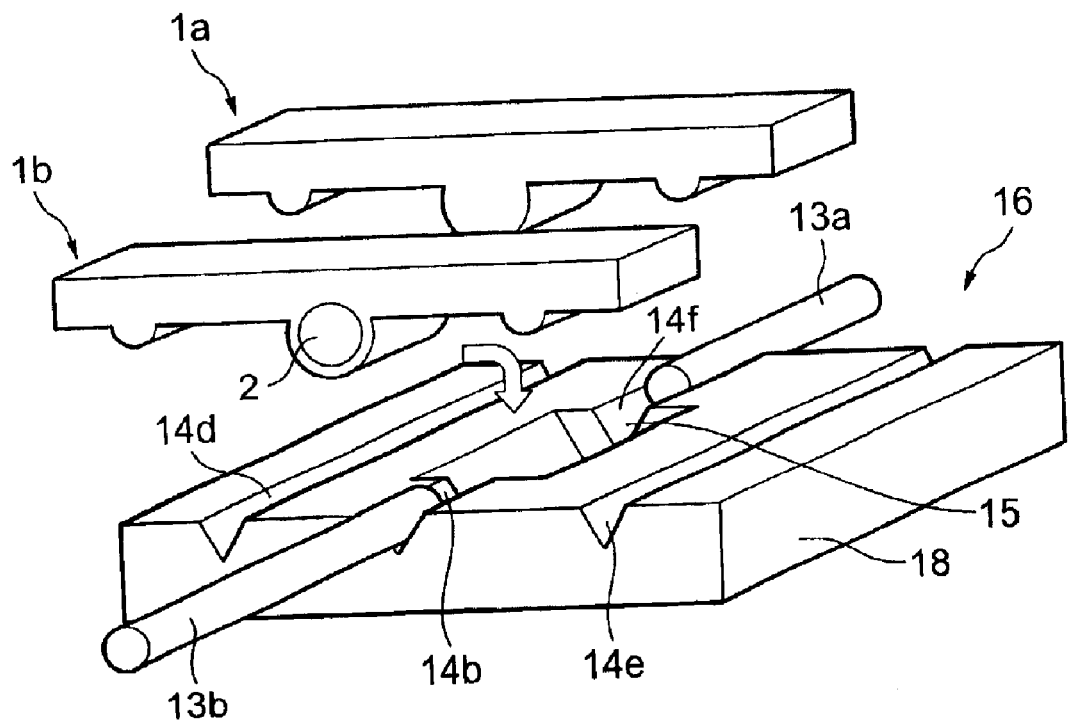
FIG. 3 is a perspective view for showing a configuration of an optical module different from that of FIG. 2 using the optical element of FIG. 1.

It is to be noted that the laser diode 12 having a configuration shown in FIG. 2 may be replaced by a photo-diode or an optical fiber. FIG. 3 is a perspective view for explaining a configuration of an optical module 16, which optically couples one optical fiber and another using as many as two of the optical elements 1.

The optical module 16 comprises a support substrate 18, two single-mode optical fibers 13a and 13b having a diameter of 125 µm, and two optical elements 1a and 1b. Further, the optical fiber 13a, the two optical elements 1a and 1b, and the optical fiber 13b are coupled optically, being arranged on the support substrate 18 in this order with predetermined spacings therebetween in such a manner as to share the same optical axis.

The support substrate 18 has grooves therein for arranging members, which grooves are clearly shown in FIG. 3 in a condition where the optical elements 1 are yet to be mounted.

The support substrate 18 is different from the support substrate 11 shown in FIG. 2 in configuration of the grooves for the member arrangement. The support substrate 18 has V-grooves 14d and 14e formed therein in place of the V-grooves 14a and 14c respectively in the support substrate 11. The V-grooves 14d and 14e are the same as the V-grooves 14a and 14c in configuration except that they are each formed from one end through the other end of the support substrate 18. Further, the support substrate 18 has a new V-groove 14f formed therein in addition to and on the opposite side of the V-groove 14b of FIG. 2 formed continuously with the groove 15. The V-groove 14f is an extension of the V-groove 14b and formed from the groove 15 through the other end of the support substrate 18, having the same configuration as the V-groove 14b. That is, the V-grooves 14b and 14f can be considered to be one V-groove formed from one end through the other end of the support substrate 11 and disconnected by the groove 15.

In the optical module 16, the projection 4a or 4b of each of the optical elements 1a and 1b is arranged in such a manner as to come in contact with the V-groove 14d or 14e respectively.

The other configuration components are the same as those of the optical module 12 of FIG. 2 and duplicate explanation thereof is omitted.

The present inventor actually has experimentally produced an optical module having the configuration described above and found that the optical element can be mounted easily and rapidly. This optical module has been able to have a coupling efficiency of 85%.

The following will describe an optical element 21 according to a second embodiment of the present invention.

Figure 4:
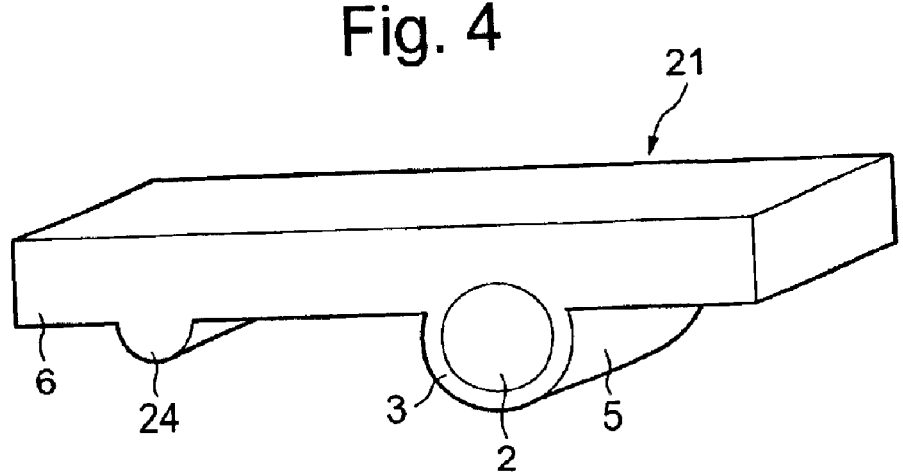
FIG. 4 is a perspective view for showing a configuration of an optical element according to a second embodiment of the present invention.

FIG. 4 is a perspective view showing a configuration of the optical element 21. The optical element 21 is different from the optical element 1 of the first embodiment in that it has one projection. This difference is detailed below to omit duplicate explanation of the same configuration components as those of the optical element 1.

The optical element 21 mainly comprises a lens 2, one projection 24, and a handle 6.

In the optical element 21, as shown in FIG. 4, the lens 2 is positioned somewhat right of a center of the handle 6. Although the projection 24 is positioned on the left side of the lens 2 in the present embodiment, it may be positioned on the right side thereof. The projection 24 has the same configuration and shape as those of the projection 4a. That is, the optical element 21 can be considered to have a shape obtained by cutting off the predetermined positions between the lens 2 and the projection 4b of the optical element 1 shown in FIG. 1.

As the optical element 1, the optical element 21 can be produced by performing etching on a silicon substrate using photolithographic and etching technologies.

If the optical element 1 is replaced by the optical element 21, it is possible to constitute the same optical module as that shown in FIG. 2 or 3. In this case, the lens 21 is positioned in a direction perpendicular to an optical axis by using the only one projection 24. Therefore, the optical element 21 may rotate around the projection 24 as a center but within a tolerance thereof, which gives rise to no problem.

In a manner similar to that described above, a laser diode 12 and an optical fiber 13 are arranged and fixed.

As in the case of the first embodiment, the present embodiment thus provides an effect of being able to mount an optical device precisely without a limit in size of the lens. Further, although the first embodiment needs to take into account an error in forming the two projections because the optical element is positioned at two couplings, the present invention need not to do so.

The following will describe an optical element 31 according to a third embodiment of the present invention.

Figure 5:
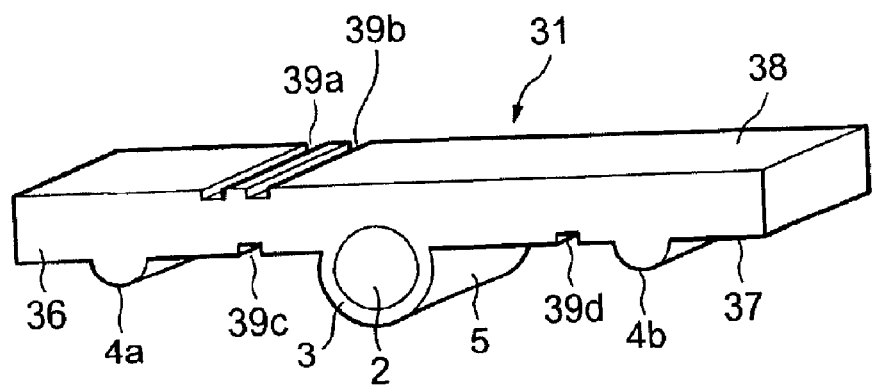
FIG. 5 is a perspective view for showing a configuration of an optical element according to a third embodiment of the present invention.

FIG. 5 is a perspective view showing a configuration of the optical element 31. In the configuration of the optical element 31, grooves are additionally formed in the top face 8 and the back face 7 of the handle 6 of the optical element 1. This point is detailed below to omit duplicate explanation of the same configuration components as those of the optical element 1.

The optical element 31 mainly comprises a lens 2, two projections 4a and 4b, and a handle 36.

The handle 36 has the same configuration components as those of the handle 6 except that a plurality of grooves are formed in the handle 6 shown in FIG. 1 at predetermined positions.

A top face 38 of the handle 36 has grooves 39a and 39b formed therein and a bottom face 37 thereof has grooves 39c and 39d formed therein.

The grooves 39a, 39b, 39c, and 39d each have openings in a lens formation face and the opposite face and extend in a direction perpendicular to a surface of the lens 2. These grooves are formed by etching so as to have a roughly rectangular cross section in the present embodiment.

As shown in FIG. 5, the grooves 39a and 39b are positioned on the right side of a center of the handle 36. By providing such grooves 39a and 39b, the handle 36 is provided with an asymmetrical configuration between right and left with respect to a virtual plane containing an optical axis of the lens 2 and perpendicular to the top face 38. By utilizing this asymmetry, it is possible to easily distinguish between the lens formation face and the opposite face of the optical element 31. It is to be noted that although the two grooves 39a and 39b are provided in the present embodiment, the number of the grooves is not limited thereto as far as the handle has an asymmetrical shape.

The grooves 39c and 39d, on the other hand, are roughly symmetrically arranged horizontally between the projection 4a and an extension 5 and between the extension 5 and the projection 4b respectively. These grooves 39c and 39d are used as alignment markers when mounting the optical element 31 on a support substrate. It is to be noted that these grooves 39c and 39d need not always be arranged symmetrically between right and left.

Figure 6:
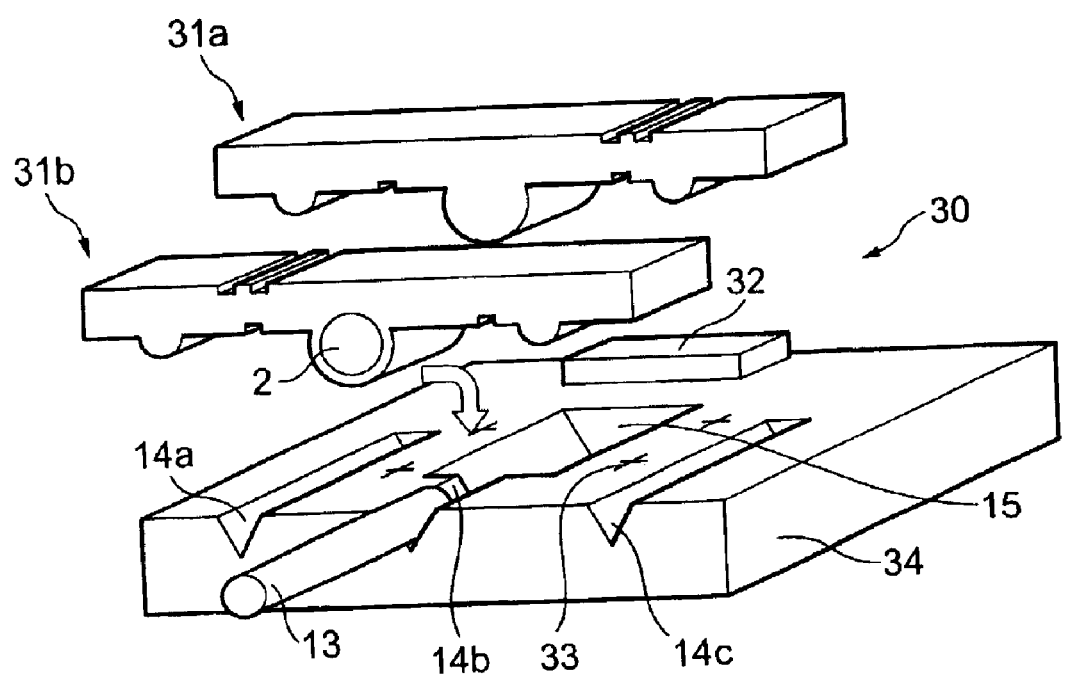
FIG. 6 is a perspective view for showing a configuration of an optical module using the optical element FIG. 5.

FIG. 6 is a perspective view for explaining a configuration of an optical module using as many as two of the optical elements 31. An optical module 30 comprises a support substrate 34, a photo-diode 32, a single-mode optical fiber 13 having a diameter of 125 μm, and two optical elements 31a and 31b.

The photo-diode 32, the two optical elements 31a and 31b, and the optical fiber 13 are coupled optically, being arranged on the support substrate 34 in this order with predetermined spacings therebetween in such a manner as to share the same optical axis.

The support substrate 34 has been obtained by providing an alignment mark 33 both between the V-groove 14a and the groove 15 and between the groove 15 and the V-groove 14c on the top face of the support substrate 11 shown in FIG. 2. The support substrate 34 has the same configuration components as those of the support substrate 11 shown in FIG. 2 except these alignment marks 33 and their description is omitted to avoid explanation of the duplicate configuration components.

These alignment marks 33 are used as alignment markers when mounting the optical elements 31a and 31b. Further, positions of the alignment marks 33 on this support substrate 34 and those of the grooves 39c and 39d in each of the two optical elements 31a and 31b are set in such a manner that when these positions coincide with each other, a position of the projection 4a or 4b of each of the two optical elements 31a and 31b may coincide with a position of an opening of the groove 39c or 39d respectively.

Although the alignment marks 33 are formed to have a shape of a cruciform in the present embodiment, the shape is not limited thereto. For example, they may be constituted of a recess having any other shape. Further, although the four alignment marks 33 are used in the present embodiment, the number thereof can be increased as necessary.

The following will describe a procedure for mounting the lens 31a and 31b on the support substrate 34. First, the lens formation face of each of the optical elements 31a and 31b is identified utilizing asymmetry in shape owing to the grooves 39a and 39b. Then, the two optical elements 31a and 31b are aligned with the support substrate 34 using the openings of the respective grooves 39c and 30d in the optical elements 31a and 31b and the alignment marks 33 on the support substrate 34 as a reference and arranged utilizing image processing by a CDD camera etc. By arranging them according to such a procedure, they are aligned in a direction of the optical axis. They are aligned in a direction perpendicular to the optical axis by confirming that, as described above, the projections 4a and 4b butt against the V-grooves 14a and 14c respectively. When it is confirmed that the optical elements 31a and 31b have been arranged at appropriate positions, they are each fixed to the support substrate 34.

According to a conventional mounting procedure, when mounting the optical elements, alignment has been performed often using an upper hem of the lens formation face as a reference. However, according to such a conventional method, a mounting error would occur depending on an outline shape of the lens. Especially in the case of a lens whose side face is formed by etching etc., the side face may have some angle with respect to a direction perpendicular to a face on which the lens has been formed. In this case, as the lens is inclined, an error occurs in optical-axial distance, thereby seriously contributing to degradation in efficiency of optical coupling between the optical element and a photo diode or an optical fiber.

In contrast, by the present embodiment, alignment is performed using the alignment grooves 39c and 39d formed in the bottom face of the handle, thereby enabling precisely mounting the optical elements easily and rapidly independently of the outline shape of the optical elements.

The present inventor actually has experimentally produced an optical module having the configuration described above and found that the optical element can be mounted easily and rapidly. This optical module has been able to have a coupling efficiency of 63%. In such a configuration as shown in FIG. 6 also, the photo-diode 32 may be replaced by a laser diode or an optical fiber. In fact, in a case of a laser diode, a coupling efficiency of 43% has been obtained.

Thus, the present embodiment provides an effect that as in the case of the first embodiment, high-precision mounting is possible without a limit in size of the lens. Furthermore, by the present embodiment, by performing alignment using the alignment grooves in the optical device and the alignment marks on the support substrate, mounting precision can be improved independently of the outline shape of the optical element. By forming asymmetrical grooves in the optical element, it is possible to easily identify the lens formation face prior to mounting.

Although there has been hereinabove described the preferred embodiments of the present invention with reference to the accompanying drawings, of course, the present invention is not limited by these embodiments. Accordingly, any and all modifications and variations which may occur to those skilled in the art, should be considered to be within the scope of a technological concept of the present invention as defined in the appended claims.

The shapes of the lens, the rim, the handle, the projection, the extension, the groove, the alignment mark, etc. are not limited to those described above. For example, the lens is not limited in shape to a circle and may be formed in any desired shape. Further, the lens may be of a refractive type. The cross section of the groove formed in the optical element is not limited to a roughly rectangular shape and may be roughly a V-shape, trapezoidal shape, semi-circular shape, or rectangular shape or may be any other shape that matches mounting conveniences.

Further, although the embodiments have been described in an example where the lens is given as a light flux converter and the optical element is given as an optical device, the present invention is not limited thereto. For example, the light flux converter may be an optical deflector and the optical device may be an optical deflection element in application of the present invention.

Further, although in the embodiments the two optical elements have been used in the optical module, the number of the optical elements to be mounted in the optical module is not limited thereto.

What is claimed is:

1. An optical device mountable on a support substrate having a member arrangement groove, comprising:
   a handle arranged over the support substrate when the optical device is mounted on the support substrate;

a light flux converter formed on a bottom face of the handle and at a predetermined position, and having an optical axis that extends in a direction perpendicular to an end face of the handle and parallel to the bottom face of the handle; and at least one projection which is provided on the bottom face of the handle, having a length that extends along the bottom face in a direction parallel to the optical axis, and having a cross-sectional shape taken perpendicular to the length of the projection, that permits the projection to come into contact with the member arrangement groove when the optical device is mounted on the support substrate, the projection being disposed at a position separated by a predetermined distance from the light flux converter.

2. The optical device according to claim 1, wherein the handle is roughly rectangular in shape and there are up to two of the projections.

3. The optical device according to claim 1, wherein the projection has an arc shape.

4. The optical device according to claim 3, wherein the support substrate is mounted with an optical fiber and an overall size of the arc shape is about the same as a predetermined overall size of the optical fiber.

5. The optical device according to claim 1, wherein the optical device is a silicon crystal substrate.

6. The optical device according to claim 1, wherein the light flux converter is a diffractive optical device.

7. The optical device according to claim 1, wherein the light flux converter is a lens.

8. An optical module, comprising:

a support substrate having in a surface thereof an optical fiber fixing groove and an alignment groove;

an optical device mountable on the support substrate, and having:

a handle arranged over the support substrate when the optical device is mounted on the support substrate;

a light flux converter formed on a bottom face of the handle and at a predetermined position, and having an optical axis that extends in a direction perpendicular to an end face of the handle and parallel to the bottom face of the handle, and at least one projection which is provided on the bottom face of the handle, having a length that extends along the bottom face in a direction parallel to the optical axis, and having a cross-sectional shape taken perpendicular to the length of the projection, that permits the projection to come into contact with the alignment groove when the optical device is mounted on the support substrate, the projection being disposed at a position separated by a predetermined distance from the light flux converter; and an optical fiber which is arranged in the optical fiber fixing groove in the support substrate, to be coupled optically with the light flux converter of the optical device.

9. The optical module according to claim 8, wherein the optical fiber fixing groove and the alignment groove have a same cross sectional size and shape.

10. The optical module according to claim 8, wherein the at least one projection and the optical fiber have a same diameter.

11. The optical module according to claim 10, wherein the optical fiber fixing groove and the alignment groove are parallel to each other.

12. The optical module according to claim 8, wherein the optical fiber fixing groove and the alignment groove are parallel to each other.

* * * * *